US012737369B2

(12) United States Patent
Newman et al.

(10) Patent No.: US 12,737,369 B2
(45) Date of Patent: Sep. 15, 2026

(54) SYSTEMS AND METHODS FOR INTEGRATING REAL-TIME DATA WITH LARGE LANGUAGE MODELS

(71) Applicant: Satisfi Labs Inc., Tampa, FL (US)

(72) Inventors: Randy Newman, Tampa, FL (US); Don White, Tampa, FL (US)

(73) Assignee: Satisfi Labs Inc., Tampa, FL (US)

( * ) Notice: Subject to any disclaimer, the term of this patent is extended or adjusted under 35 U.S.C. 154(b) by 0 days.

(21) Appl. No.: 19/191,966

(22) Filed: Apr. 28, 2025

(65) Prior Publication Data

US 2025/0342165 A1 Nov. 6, 2025

Related U.S. Application Data

(60) Provisional application No. 63/641,580, filed on May 2, 2024.

(51) Int. Cl.

| | |
|---|---|
| ***G06F 16/2458*** | (2019.01) |
| ***G06F 16/2452*** | (2019.01) |
| ***G06F 16/2455*** | (2019.01) |
| ***G06F 16/3329*** | (2025.01) |
| ***G06F 16/334*** | (2025.01) |

(52) U.S. Cl.

CPC .... *G06F 16/2477* (2019.01); *G06F 16/24522* (2019.01); *G06F 16/24568* (2019.01); *G06F 16/3329* (2019.01); *G06F 16/334* (2019.01); *G06F 16/3347* (2019.01)

(58) Field of Classification Search

CPC ............ G06F 16/285; G06F 16/24578; G06F 16/2458; G06F 16/2477

USPC ........................................................ 707/765

See application file for complete search history.

(56) References Cited

U.S. PATENT DOCUMENTS

| | | | |
|---|---|---|---|
| 9,244,968 B2 † | 1/2016 | Gross | |
| 12,254,029 B1 * | 3/2025 | Veillon | G06F 16/285 |
| 2009/0049017 A1 * | 2/2009 | Gross | G06F 16/24578 |
| 2024/0144192 A1 * | 5/2024 | Weissenberger | G06F 3/0482 |

* cited by examiner
† cited by third party

*Primary Examiner* — Shahid A Alam
(74) *Attorney, Agent, or Firm* — Bradley Arant Boult Cummings LLP; Adam J. Thompson

(57) ABSTRACT

This disclosure relates to a system and method for using large language models (LLMs) to answer natural language queries. The system can receive and analyze temporal entries and stores them with metadata in vector format. The system can receive a query with query text from a user and generate an LLM query with a subset of the data sets based on the query text. The system can submit the LLM query to an LLM system and use the LLM response to generate a response to the query. The response may include text and/or graphics, such as summaries, answers, suggestions, charts, etc. The system may provide the response via a user interface, such as a voice assistant, a chatbot, a web page, etc.

19 Claims, 3 Drawing Sheets

SYSTEMS AND METHODS FOR INTEGRATING REAL-TIME DATA WITH LARGE LANGUAGE MODELS

CROSS-REFERENCE TO RELATED APPLICATIONS

This application claims the benefit of, and priority to, U.S. Provisional Application No. 63/641,580, filed on May 2, 2024, and entitled "SYSTEMS AND METHODS FOR INTEGRATING REAL-TIME DATA WITH LARGE LANGUAGE MODELS," the contents of which are hereby incorporated by reference in its entirety as if set forth herein.

TECHNICAL FIELD

This application generally relates to systems and methods for processing real-time data and, more specifically, to integrating real-time data with retrieval-augmented generation models and large language models.

BACKGROUND

When developing commercial applications that integrate Large Language Models (LLMs), the commercial applications often require access to up-to-date data feeds. Retrieval-Augmented Generation (RAG) models have been used as potential solutions for augmenting LLMs with up-to-date data. RAG models with real-time data feeds aim to provide up-to-date and contextually rich answers by enhancing response generation through the retrieval and incorporation of relevant information from external data sources. Though RAG models have been used as a potential solution, they have their respective drawbacks. For example, combining dynamic feed data with static data can be challenging when implementing a RAG model.

Combining RAG models with real-time data feeds can pose unique challenges, especially when dealing with date-based data. Handling date-based data introduces complexity, particularly with relative dates. For example, relative date interpretation can be a challenging task for LLMs and RAG models. Relative dates ("yesterday," "last week," "in two days") are contextually driven and depend on the current date, which can be dynamic and constantly changing. Current RAG models have difficulties understanding the context of the "current" time when processing the query and when retrieving data. This issue is especially true if the RAG models access static or slowly updating databases.

In another example, time zone variations can prove challenging to LLMs and RAG models. The interpretation of relative dates can vary significantly across different time zones. For instance, "today" could mean different absolute dates depending on the user's and the server's time zones. Real-time systems need to account for these variations to ensure the correct interpretation and retrieval of date-based information.

In yet another example, LLMs and RAG models can struggle with data freshness and synchronization. Real-time data feeds must be continuously updated to ensure the accuracy of retrieved information. For date-sensitive queries, even slight delays in data updates can lead to incorrect or outdated information being incorporated into the model's responses.

In yet another example, complex query handling can prove challenging to RAG models. Queries involving relative dates may also include complex conditions or comparisons (e.g., "the first Monday after next week"). Parsing and understanding such queries and then mapping them to the correct dates in the real-time data feeds require advanced natural language understanding and temporal reasoning capabilities.

In yet another example, RAG models can have difficulties integrating with dynamic data sources. The reliability of external data sources is crucial for RAG models. Inconsistencies, errors, or latency in real-time feeds can significantly impact the model's ability to generate accurate responses based on current dates.

Therefore, there is a long-felt but unresolved need for a system or method that incorporates sophisticated natural language understanding mechanisms, robust time zone management, and efficient synchronization with dynamic data sources to process real-time and date-based data. Additionally, there is a long-felt but unresolved need for a system or method that includes fallback strategies and error-handling mechanisms to maintain accuracy and reliability when absolute precision in date interpretation is critical.

BRIEF SUMMARY OF DISCLOSURE

Briefly described, and in various examples, the present disclosure can relate to systems and methods for augmenting LLMs and RAG models with up-to-date data while mitigating issues associated with temporal data. The present disclosure can include a computing environment that can aggregate data from external resources, process the data received from the external resources, and provide the processed data to LLMs and/or RAG models to generate up-to-date responses.

The external resources can include any particular data repository managed by third parties. The data repositories can include data defining real-time events and/or location listings for a particular geographical region and/or organization. Much of the data received from the external resources can include temporal data that is uninterpretable by LLMs and RAG models. For example, LLMs and RAG models can find it difficult to employ their knowledge base to generate a response to a question that include date-based data (e.g., a statement such as "next week").

To mitigate the issues associated with the temporal data, the present disclosure can include systems and methods for augmenting the external data with various terms, keys, and other temporal information such that the RAG models and/or the LLMs can understand the data and generate proper responses. For example, the computing environment of the present disclosure can process external data by identifying temporal entities and generating relative timing data and/or absolute timing data. The computing environment can create contextual documents associated with the external data. The contextual documents can function as updated descriptions of the events and/or listings. Along with the various information associated with the events and/or listings (e.g., event name, listing name, event address, listing address, event description, listing description), the contextual documents can include the relative timing data and the absolute timing data. The relative timing data can include various textual descriptions of the date associated with the listing or event. For example, the relative timing data can include terms such as "next week," "next month," "this Friday," and/or any other term used to describe the relative time of the event and/or listing. The absolute timing data can include various definitive textual or numerical descriptions of the date associated with the listing or event. For example, the absolute timing data can include terms such as "Aug. 2, 2023," "Nov. 11, 2011," "March," and/or any other fixed representation of the date that does not require a contextual understanding of the current time to identify the actual date of the event.

The disclosed system can include one or more client devices for interfacing with the computing environment. The client device can send query requests to the computing environment. The query requests can include text that requests information from the computing environment. For example, the query request can include query text that states, "When is the next tennis tournament in Atlanta?" On receiving this request, the computing environment can retrieve pertinent contextual documents, feed the query request and the contextual documents to an LLM, and send the response generated by the LLM to the client device. The dialog between the client device and the computing environment can continue as long as the client device has subsequent query requests. Once all the query requests have been satisfactorily answered, the dialogue between the client device and the computing environment can terminate.

These and other aspects, features, and benefits of the claimed innovation(s) will become apparent from the following detailed written description of the preferred examples and aspects taken in conjunction with the following drawings, although variations and modifications thereto may be effected without departing from the spirit and scope of the novel concepts of the disclosure.

BRIEF DESCRIPTION OF THE FIGURES

The accompanying drawings illustrate one or more examples and/or aspects of the disclosure and, together with the written description, serve to explain the principles of the disclosure. Wherever possible, the same reference numbers are used throughout the drawings to refer to the same or like elements of the present concept, and wherein.

DETAILED DESCRIPTION

Figure 1:
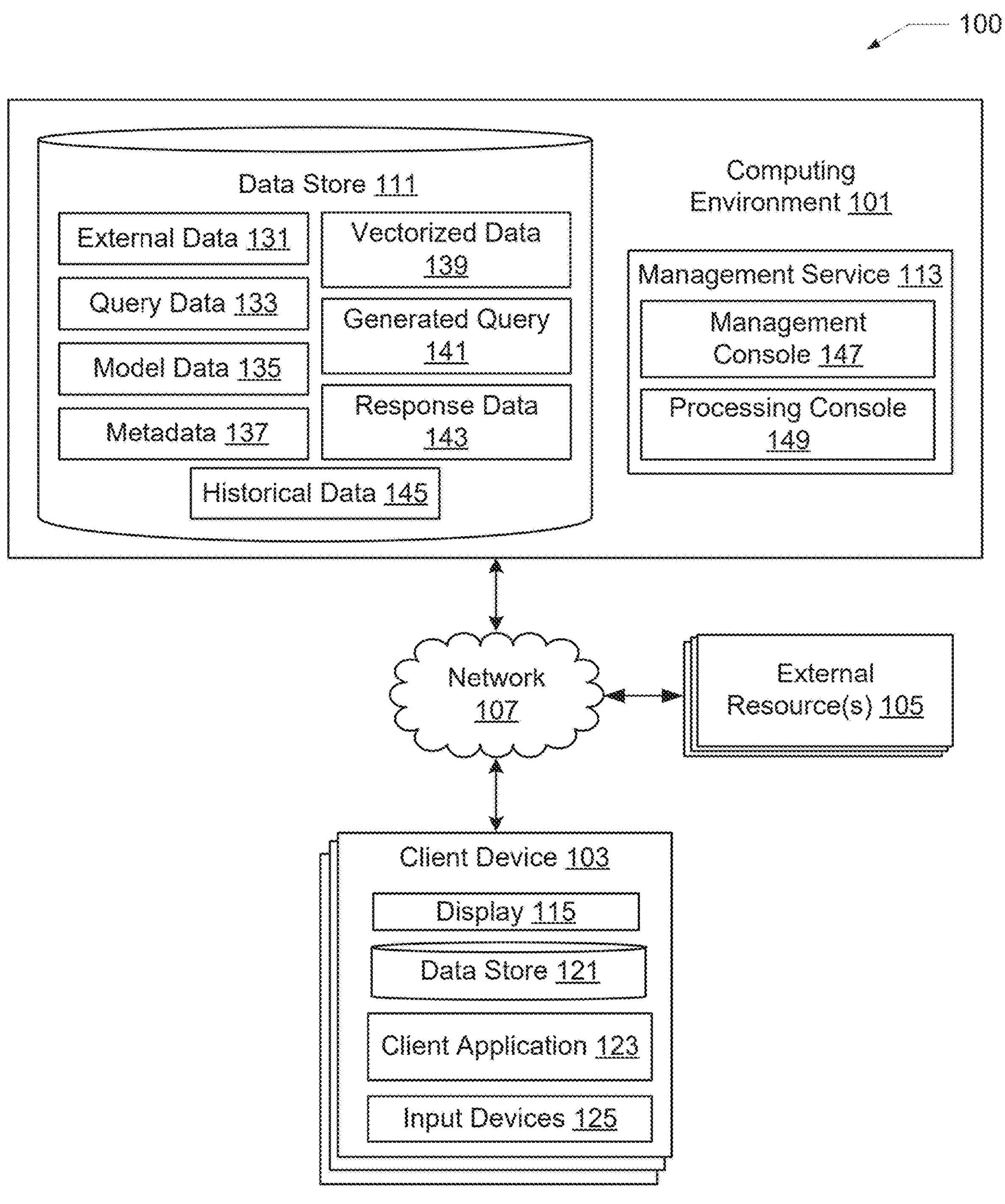
FIG. 1 illustrates a networked environment, according to one example of the disclosed technology.

Whether a term is capitalized is not considered definitive or limiting of the meaning of a term. As used in this document, a capitalized term shall have the same meaning as an uncapitalized term, unless the context of the usage specifically indicates that a more restrictive meaning for the capitalized term is intended. However, the capitalization or lack thereof within the remainder of this document is not intended to be necessarily limiting unless the context clearly indicates that such limitation is intended.

Overview

For the purpose of promoting an understanding of the principles of the present disclosure, reference will now be made to the examples illustrated in the drawings and specific language will be used to describe the same. It will, nevertheless, be understood that no limitation of the scope of the disclosure is thereby intended; any alterations and further modifications of the described or illustrated examples and any further applications of the principles of the disclosure as illustrated therein are contemplated as would normally occur to one skilled in the art to which the disclosure relates. All limitations of scope should be determined in accordance with and as expressed in the claims.

Aspects of the present disclosure generally relate to systems and methods for augmenting LLMs and RAG models with up-to-date data while mitigating issues associated with temporal data. The present disclosure can include a computing environment, one or more client devices, and one or more external resources distributed across a network. The computing environment can aggregate data from the external resources, process the data received from the external resources, and provide the processed data to LLMs and/or RAG models to generate up-to-date responses. The client devices can render applications for generating queries to interact with the computing environment, receive data and responses from the computing environment, and render various responses and information received from the computing environment. The external resources can include any particular data repository managed by third parties. The data repositories can include data defining various events and/or location listings for a particular geographical region and/or organization.

LLMs and RAG models can find it difficult to employ their knowledge base and generate a response to a question that includes date-based data (e.g., a statement such as "next week"). For example, much of the data received from the external resources can include temporal data that is uninterpretable by LLMs and RAG models. To mitigate the issues associated with the temporal data, the present disclosure can include systems and methods for augmenting the external data with various terms, keys, and other temporal information such that the RAG models and/or the LLMs can understand the data and generate proper responses.

The computing environment can employ various APIs to extract external data from the external resources. On receiving the external data from the external resources, the computing environment can tabulate and format the external data such that the data can be further used in various downstream procedures. The computing environment can employ various natural language processing systems and/or other computational algorithms to interpret the tabulated data. For example, the computing environment can include a natural language processing system to process textual data stored in the tabulated data. The natural language processing system can identify temporal data and other complex linguistic data present in the tabulated data. For example, the natural language processing system employed by the computing environment can identify temporal entities that describe the date of particular events and/or listings.

The computing environment of the present disclosure can process external data by identifying temporal entities and generating relative timing data and/or absolute timing data. The computing environment can create contextual documents associated with the external data, which can function as updated descriptions of the events and/or listings. Along with the various information associated with the events and/or listings (e.g., event name, listing name, event address, listing address, event description, listing description), the contextual documents can include the relative timing data and the absolute timing data. The relative timing data can include various textual descriptions of the date associated with the listing or event. For example, the relative timing data can include terms such as "next week," "next month," "this Friday," and/or any other term used to describe the relative time of the event and/or listing. The absolute timing data can include various definitive textual or numerical descriptions of the date associated with the listing or event. For example, the absolute timing data can include terms such as “Aug. 2, 2023,” “Nov. 11, 2011,” “March,” and/or any other fixed representation of the date that does not require a contextual understanding of the current time to identify the actual date of the event.

The computing environment can store the contextual documents in one or more lists, data sets, and/or subsets of data based on various categorical differences. For example, contextual data can be sorted based on time, location, associated organization, and/or any other categorical difference. The computing environment can employ tokenization algorithms and vector embedding algorithms to tokenize the contextual documents and generate vector embeddings for each word of the contextual documents. The computing environment can store the vector embeddings in a vectorized database such that the computing environment can identify differences and similarities between the data.

The client devices can interface with the computing environment. The client device can send query requests to the computing environment. The query requests can include text that requests information from the computing environment. For example, the query request can include query text that states, “When is the next tennis tournament in Atlanta?” On receiving this request, the computing environment can vectorize the query request. The computing environment can compare the vector embeddings of the query request with the data stored in the vectorized data. The computing environment can identify and retrieve the contextual documents that share similar vectorized values to the vector embeddings of the query request. The computing environment can feed the query request and the identified contextual documents to an LLM and send the response generated by the LLM to the client device. The dialog between the client device and the computing environment can continue as long as the client device has subsequent query requests. Once all the query requests have been satisfactorily answered, the dialogue between the client device and the computing environment can terminate.

Example Embodiments

Referring now to the figures, for the purposes of example and explanation of the fundamental processes and components of the disclosure, reference is made to FIG. 1, which illustrates an example networked environment 100. As will be understood and appreciated, the networked environment 100 shown in FIG. 1 represents merely one approach or example of the present concept, and other aspects are used according to various examples of the present concept.

Machine learning models, Large Language Models (LLMs), and other similar systems can lack the ability to generate responses based on up-to-date data. For example, LLMs can only generate responses based on a static dataset on which the LLMs were initially trained. This static set of data tends to lack up-to-date data. Retrieval-Augmented Generation (RAG) models can supplement current LLMs with up-to-date data. For example, a RAG model can retrieve and supply up-to-date data to one or more LLMs such that the LLMs can generate responses based on the up-to-date data. Though beneficial, RAG models can lack the ability to interpret temporal data, such as date-based data (e.g., data that includes statements such as “yesterday,” “next week,” “this week,” etc.), temporal data generated in distinct time zones, and/or any other data that causes similar deficiencies. Due to its time-specific nature, RAG models can find it challenging to interpret specific forms of temporal data. For example, a RAG Model can find it difficult to interpret the meaning of the term “yesterday” when it is used on different days.

The networked environment 100 can include various systems and methods to augment RAG models and LLMs with up-to-date data while mitigating the issues associated with temporal data, date-based data, and/or other data that create similar deficiencies. For example, the networked environment 100 can include various systems and methods to process temporal data. When processing the temporal data, the networked environment 100 can translate the temporal data into data that the RAG models and the LLMs can interpret. In another example, the networked environment 100 can include various systems and methods for mitigating issues associated with data created across various time zones. In yet another example, the networked environment 100 can include various systems and methods that can process complex linguistic statements that include various types of natural language and/or temporal data (e.g., date-based data, time-based data, etc.).

The networked environment 100 can include a computing environment 101, a client device 103, and one or more external resources 105, which can be in data communication with each other via a network 107. The network 107 can include, for example, the Internet, intranets, extranets, wide area networks (WANs), local area networks (LANs), wired networks, wireless networks, or other suitable networks, etc., or any combination of two or more such networks. For example, such networks can include satellite networks, cable networks, Ethernet networks, Bluetooth networks, Wi-Fi networks, Near Field Communication (NFC) networks, and other types of networks.

The computing environment 101 can include, for example, a server computer or any other system providing computing capability. Alternatively, the computing environment 101 can employ more than one computing device that can be arranged, for example, in one or more server banks, computer banks, or other arrangements. Such computing devices can be located in a single installation or can be distributed among many different geographical locations. For example, the computing environment 101 can include one or more computing devices that together can include a hosted computing resource, a grid computing resource and/or any other distributed computing arrangement. In some cases, the computing environment 101 can correspond to an elastic computing resource where the allotted capacity of processing, network, storage, or other computing-related resources can vary over time.

Various data can be stored in a data store 111 that can be accessible to the computing environment 101. The data store 111 can be representative of one or more of data stores 111 as can be appreciated. The data stored in the data store 111, for example, can be associated with the operation of the various applications and/or functional entities described below. The data stored in the data store 111 can include, for example, a list of data, and potentially other data. The data store 111 can function as the central data storage system of the networked environment 100. For example, the data store 111 can include all pertinent data used for processes performed by the computing environment 101, the client device 103, and/or any other particular resource distributed across the network 107. The data store 111 can include data received from the client device 103, the external resources 105, and/or any other resource distributed across the network 107. The data store 111 can include but is not limited to external data 131, query data 133, model data 135, metadata 137, vectorized data 139, generated query 141, response data 143, and historical data 145.

The external data 131 can include any particular data received from the external resources 105. The external data 131 can include but is not limited to data defining events in a particular area, data defining listings in a particular area, data defining sporting events associated with a particular league, data defining sporting events associated with a particular team, data defining events associated with a particular venue, data defining events associated with a particular organization, data defining listings associated with a particular organization, data defining descriptions of particular events, and data defining descriptions of particular listings. For example, a first external resource 105 can include a data repository managed by a non-profit organization promoting travel to a particular region. The first external resource 105 can include data defining events and listings taking place in the particular region along with descriptions of each event and listing. Events can be defined as set activities provided by a particular organization. Listings can define locations, venues, and/or organizations that host the particular events. The computing environment 101 can interface with the first external resource 105 and receive the data defining the events, the listings, and the descriptions of the events and listings. The computing environment 101 can store the data defining the events, the listings, and the descriptions of the events and listings in the external data 131 of the data store 111.

The external data 131 can include temporal data. Temporal data can include various types of data that define a particular unit of time. For example, temporal data can include date-base data in a numerical or written format (e.g., Feb. 4, 2023, "last Friday", etc.). temporal data that has an absolute value (e.g., time or dates in a numerical format) can be defined as absolute timing data. Temporal data that has a relative value (e.g., time or dates that are written and contextual based on the statement they are associated with) can be defined as relative timing data (also referred to herein as date-based data). The temporal data can be integrated as a component of the events data and/or the listings data. Though discussed as a component of the external data 131, the computing environment 101 can store the temporal data in the metadata 137.

The query data 133 can include one or more query requests generated and/or received from the client device 103. The query requests can define any particular request asking for the computing environment 101 to reproduce some form of data and/or information. The query data 133 can include but is not limited to text-based queries, audio-based queries, video-based queries, and/or any other data requesting some form of information from the computing environment 101. For example, the query data 133 can include a text-based request made by the client device 103 stating, "What are all of the exclusive museum events happening in Chicago next week?" In another example, query data 133 can include an audio recording made after a phone call stating, "Where can I play trivial next Thursday with a group of 15 people?" In yet another example, the query data 133 can include a series of text-based requests made by the client device 103 stating, "When and where are all the next Foo Fighter concerts over the next three months?"

The model data 135 can include any information used to process, train, and implement machine learning models/algorithms, artificially intelligent systems, deep learning models (e.g., neural networks), LLMs, and/or natural language processing systems. Non-limiting examples of models stored in the model data 135 can include topic modelers, neural networks, linear regression, logistic regression, ordinary least squares regression, stepwise regression, multivariate adaptive regression splines, ridge regression, least-angle regression, locally estimated scatterplot smoothing, decision trees, random forest classification, support vector machines, Bayesian algorithms, hierarchical clustering, k-nearest neighbors, K-means, expectation maximization, association rule learning algorithms, learning vector quantization, self-organizing map, locally weighted learning, least absolute shrinkage and selection operator, elastic net, feature selection, computer vision, dimensionality reduction algorithms, gradient boosting algorithms, and combinations thereof. Neural networks can include but are not limited to uni-layer or multilayer perceptron, convolutional neural networks, recurrent neural networks, long short-term memory networks, auto-encoders, deep Boltzmann machines, deep belief networks, back-propagations, stochastic gradient descents, Hopfield networks, and radial basis function networks. The model data 135 can include a plurality of models stored in the model data 135 of varying or similar composition or function.

The models stored in the model data 135 can include various properties that can be adjusted and optimized by the computing environment 101 during model training. The properties can include any parameter, hyperparameter, configuration, or setting of the model stored in the model data 135. Non-limiting examples of properties include coefficients or weights of linear and logistic regression models, weights and biases of neural network-type models, cluster centroids in clustering-type models, train-test split ratio, learning rate (e.g. gradient descent), choice of optimization algorithm (e.g., gradient descent, gradient boosting, stochastic gradient descent, Adam optimizer, XGBoost, etc.), choice of activation function in a neural network layer (e.g. Sigmoid, ReLU, Tanh, etc.), choice of value or loss function, number of hidden layers in a neural network, number of activation units (e.g., artificial neurons) in each layer of a neural network, drop-out rate in a neural network (e.g., dropout probability), number of iterations (epochs) in training a neural network, number of clusters in a clustering task, Kernel or filter size in convolutional layers, pooling size, and batch size.

The model data 135 can include one or more RAG models and/or one or more LLMs. The RAG models can be defined as one or more models used to augment LLMs with up-to-date data. For example, the RAG models can include a natural language processing system, a vector embedding algorithm, and/or a database for storing vectorized data. The LLMs can be defined as one or more models trained on a large corpus of data to generate large-volume textual responses. The LLMs stored in the model data 135 can include various third-party LLMs, APIs for interfacing with one or more third-party LLMs, and/or custom-programmed LLMs. For example, the LLMs stored in the model data 135 can include GPT 3.0, GPT 3.5, GPT 4.0, BERT, LaMDA, and/or any other LLM system.

The model data 135 can include one or more tokenization and vector embedding algorithms. The tokenization algorithms (also referred to herein as tokenizers) can include one or more models for tokenizing a particular input into individual tokens. Tokens can be defined as words, phrases, sentences, and/or any combination of characters extracted from a body of text. For example, the statement, "When is the next baseball game in Atlanta after next Monday?" can include eleven tokens for each word in the prior statement. The tokenization algorithms can include but are not limited to white space tokenization, Natural Language Toolkit (NLTK) word tokenizer, Textblob Word Tokenizer, spaCy Tokenizer, Gensim word tokenizer, Byte-Pair Encoding (BPE), WordPiece, SentencePiece, and/or any other algorithm that can tokenize a particular input. The vector embedding algorithms can include one or more models intended to embed each token with a respective vector equivalent. The vector embedding algorithms can include but are not limited to Word2Vec, Bag of Words model, Term Frequency-Inverse Document Frequency (TF-IDF) model, GloVe, FastText, Universal Sentence Encoder (USE), SkipThought, Doc2Vec, Paragraph Vectors, and/or any other model used to generate vector embeddings for tokens.

The metadata 137 can include any particular data generated from processing the external data 131 and/or the query data 133. The metadata 137 can include but is not limited to generated tokens, contextual documents, and any other processed data. For example, the computing environment 101 can employ one or more tokenization algorithms to generate one or more tokens from the external data 131. In another example, the computing environment 101 can process the external data 131 to generate one or more contextual documents. The contextual documents can define external data 131 (e.g., listing data and events data) reformatted into a document that is ingestible by the RAG models and/or the LLMs. For example, the contextual documents can include a listing name, a listing address, event date, event time, event relative month (e.g., "next month"), event relative week (e.g., "next week"), event relative day (e.g., next "Tuesday"), event description, listing description, and/or any other type of information extracted from the external data 131.

The vectorized data 139 can function as a vectorized database that stores embedded vectors associated with each token. For example, the vector embedding algorithms of the model data 135 can embed each token with a vector equivalent. Continuing this example, the vector equivalent can define a vector that maps the token to a unique position in a multi-dimensional space. By providing each token a vector equivalent, the computing environment 101 can compare tokens based on their proximity in the multi-dimensional space to determine how similar each token is to one another. The computing environment 101 can store each embedded vector associated with each token in the vectorized data 139 for further processing. The vectorized data 139 can include vector embeddings generated from data stored as metadata 137. For example, the computing environment 101 can generate vector embeddings for each token generated from each contextual document and store the vector embeddings in the vectorized data 139.

The generated query 141 can include one or more prompts generated and employed by the computing environment 101 to request the LLM to generate a particular response. The prompts stored in the generated query can include but are not limited to a subset of the metadata 137, a subset of the vectorized data 139, a subset of the query data 133, and/or any other particular data that may prompt the LLM to generate an applicable response. For example, the prompts can include a list of events for the next two months stored in the metadata 137 and a particular query request stored in the query data 133 requesting all hockey games in the area for the next two months. The prompts can include generated text that prompts the LLM to generate a specific type of response. For example, the prompts can include text generated by the computing environment 101 that requests the LLM to draft a textual response describing each event that will take place in a particular area over the next year. In another example, the prompts can include real-time data received through the external data 131 such that the LLM generates responses based on the most up-to-date data available to the computing environment 101.

The response data 143 can include any particular response generated by the computing environment 101. For example, the response data 143 can include any particular response generated by the LLMs and made in response to a particular query. The response data 143 can include automated responses stored in the response data 143 to specific types of query data 133. For example, the response data 143 can include safety responses to respond to negative query data 133 received from a particular client device 103. The response data 143 can include any particular response generated by and/or stored in the computing environment 101 to respond to a particular query received from the client device 103.

The historical data 145 can include any particular series of conversations, responses, analyses, and/or generated data associated with a single communication stream between a particular client device 103 and the computing environment 101. For example, the historical data 145 can include past generated queries, past query data, past metadata, past external data, and/or any other data that can be associated with a particular communication between the particular client device 103 and the computing environment 101.

Various applications and/or other functionalities can be executed in the computing environment 101 according to various aspects of the present disclosure. The components executed on the computing environment 101, for example, can include a list of applications and other applications, services, processes, systems, engines, or functionalities discussed in detail herein. The computing environment 101 can include a management service 113. The management service 113 can function as the central computing infrastructure of the computing environment 101. The management service 113 can include a management console 147 and a processing console 149.

The management console 147 can function as the central data distribution system of the computing environment 101. The management console 147 can communicate with the client device 103, the external resources 105, and/or any other system distributed across the network 107. The management console 147 can send and/or receive data across the network 107. For example, the management console 147 can include an external resource feed API 201, one or more interface APIs 203, and/or any other particular type of API used to communicate with and/or gather data from the external resources 105 and/or any other system distributed across the network 107 (see FIG. 2). The management console 147 can distribute data within the computing environment 101. For example, the management console 147 can include a data intake system 205 that can store data received from the external resources 105 into the data store 111. The management consoler 147 can include a request processing system 211 that can process query data 133 received from the client device 103. Various functionalities of the management console 147 are discussed in further detail herein.

The processing console 149 can perform all computational requirements of the computing environment 101. The processing console 149 can, for example, employ one or more LLMs from the model data 135 to generate responses to a particular generated query, generate contextual documents based on the external data 131, tokenize the metadata 137 using one or more tokenization algorithms, generate embedded vectors for each token using one or more vector embedding algorithms, and/or perform any particular computational requirement of the computing environment 101.

The processing console 149 can include a data processing service 207 that performs all data processing requirements of the computing environment 101. The processing console 149 can include a data vectorizer 209, which can employ one or more vector embedding algorithms for generating embedded vectors. The processing console 149 can include a response generator 213 for generating one or more responses through the LLMs stored in the model data 135. Various functionalities of the processing console 149 are discussed in further detail herein.

The client device 103 can be representative of a one or more client devices that can be coupled to the network 107. The client device 103 can include, for example, a processor-based system such as a computer system. Such a computer system can be embodied in the form of a desktop computer, a laptop computer, personal digital assistants, cellular telephones, smartphones, set-top boxes, music players, web pads, tablet computer systems, game consoles, electronic book readers, or other devices with like capability. The client device 103 can include a display 115. The display 115 can include, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

The client device 103 can be configured to execute various applications such as a client application 123 and/or other applications. The client application 123 can be executed in a client device 103, for example, to access network content served up by the computing environment 101 and/or other servers, thereby rendering a software interface 215 on the display 115. To this end, the client application 123 can include, for example, a browser, a dedicated application, etc., and the software interface 215 can include a network page, an application screen, etc. The client device 103 can execute applications beyond the client application 123 such as, for example, email applications, social networking applications, word processors, spreadsheets, and/or other applications.

The client application 123 can function as an interface for receiving inputs generated by one or more input devices 125. For example, the client application 123 can include a website that integrates with the software interface 215 to receive one or more inputs. The client application can include the software interface 215. The software interface 215 can include a chat box, a video-call program, an audio-call program, a video recording interface, an audio recording interface, and/or any particular software interface used to gather input data from a particular user. For example, the software interface 215 can include a chat box used to gather textual inputs generated by a keyboard connected to the client device 103. In some examples, the client application 123 and the software interface 215 can function together as one native software running on the client device 103.

The input devices 125 can include any particular peripheral that can record and forward input data to the client devices 103. For example, the input devices 125 can include but are not limited to a keyboard, a mouse, a trackpad, a microphone, a touchscreen display, a camera, one or more sensors, and/or any other peripheral used to generate inputs for the client devices 103.

The client devices 103 can each include a data store 121. The data store 121 can function as a local data storage system for each of the client devices 103. The data store 121 can function substantially similarly to the data store 111 of the computing environment 101. The data store 121 can function as a server system used to share and/or mirror data from the data store 111. The data store 121 can include a subset of data stored in the data store 111 and/or other data stored locally on the client device 103.

The external resources 105 can include any particular third-party resource used to aggregate up-to-date data. The external resources 105 can include third-party data stores, private data stores, organization specific data repositories, and/or any particular server system that stores data useful to the computing environment 101. For example, the external resources 105 can include one or more servers managed by a non-profit organization that promotes travel to a particular region. The servers managed by the non-profit organization can store event data, listing data, and/or temporal data associated with the particular region. In another example, the external resources 105 can include private data repositories managed by an international soccer federation. The private data repositories can include temporal data defining events for each soccer team associated with the international soccer federation.

Figure 2:
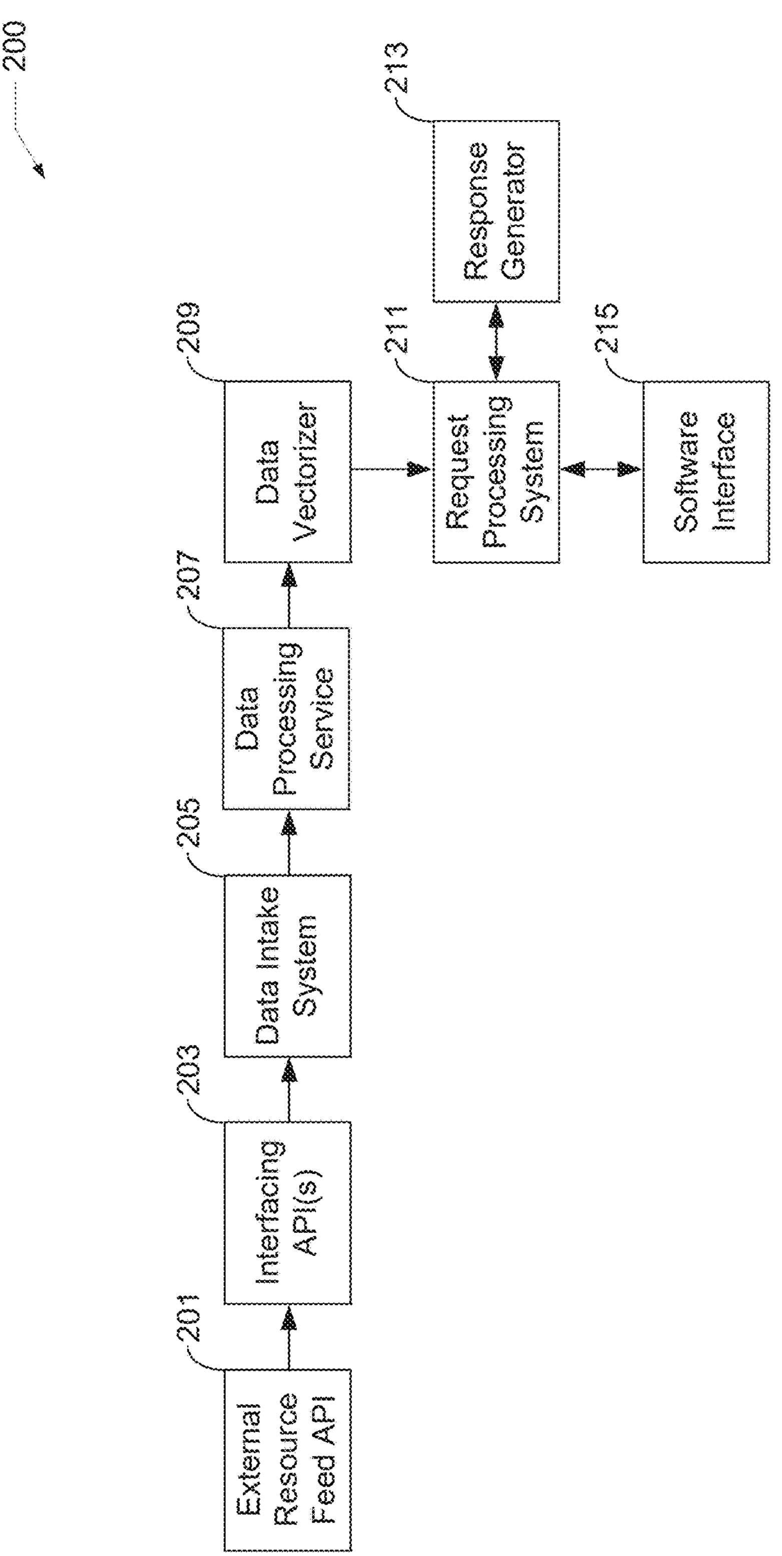
FIG. 2 illustrates a workflow performed by various components of the networked environment, according to one example of the disclosed technology.

Referring now to FIG. 2, illustrated is a workflow 200 performed by various components of the networked environment 100, according to one example of the disclosed technology. The workflow 200 can demonstrate the various components and processes used by the networked environment 100 to augment LLMs with up-to-date data while alleviating issues associated with various types of temporal data.

The computing environment 101 can begin interfacing and receiving data from the external resources 105 through an external resource feed API 201. For example, the management console 147 can include the external resource feed API 201. The external resource feed API 201 can include various functions for requesting data from the external resources 105. For example, the external resource feed API 201 can generate a request for data and send the request to a Uniform Resource Locator (URL) link associated with the datastore of the external resource 105. Continuing this example, the external resource feed API 201 can establish a connection with the datastore of the external resource 105 and receive the requested data. The external resource feed API 201 can generate requests in various time intervals over a particular period of time. For example, the external resource feed API 201 can request data from the external resources 105 on a daily, weekly, and/or monthly basis. The external resource feed API 201 can continuously request data from the external resources 105. By having a constantly updating set of data, the computing environment 101 can have an up-to-date database that is constantly refreshed with real-time data.

The computing environment 101 can access data-specific API repositories of the external resources 105 using the interfacing APIs 203. The interfacing APIs 203 can allow the management console 147 to extract specific types of data from the external resources 105. For example, the management console 147 can include a listing API and an events API, where the listing API and the events API function as specific types of interfacing APIs 203. The management console 147 can employ the listing API to extract listing data from the external resources 105. The management console 147 can employ the events API to extract events data from the external resources 105. The interfacing APIs 203 can be components of the external resource feed API 201 and/or standalone API systems of the management console 147.

The management console 147 can extract external data 131 from the external resources 105 Using the external resource feed API 201 and/or the interfacing APIs 203. The management console 147 can receive the external data 131 in any particular format. The management console 147 can receive the data as an Extensible Markup Language (XML) data type, JavaScript Object Notation (JSON) data type, YAML data type, plain-text data type, comma-separated values (CSV) data type, and/or any other applicable data type. For example, the external data 131 can include various listings and events data for a particular geographic region received from the external resources 105. The management console 147 can receive the various listings and events data in an XML data format.

On receiving raw data (e.g., the XML data format) from the external resources 105, the computing environment 101 can employ a data intake system 205 to process the raw data and store the updated data in the external data 131. The management console 147 can include the data intake system 205. The data intake system 205 can tabulate the raw data received from the external resources 105. The management console 147 can store the tabulated data in the external data 131 of the data store 111. The tabulated data can include but is not limited to event name, event type, listing name, listing type, event address, listing address, event description, listing description, absolute timing data, and/or any other pertinent information. By tabulating the raw data, the computing environment 101 can format the raw data into a compatible structure which the data processing service 207 can interpret and use for further processing.

The computing environment 101 can employ the data processing service 207 to process the tabulated data stored in the external data 131. The data processing service 207 can be a subprocess of the processing console 149. The data processing service 207 can employ one or more models from the model data 135 and/or any other particular algorithms for processing the external data 131 into metadata 137. For example, the data processing service 207 can employ natural language processing systems to process the tabulated data and generate a written description of a particular event and/or listing.

The data processing service 207 can generate one or more contextual documents. The contextual documents can define various subsets of documents that describe various listings and/or events. For example, the contextual documents can include one or more event documents and one or more listing documents. The data processing service 207 can format the tabulated data into individual contextual documents defining various features associated with the events and/or listings. For example, for each event stored in the external data 131, the data processing service 207 can generate a respective event document, which can include the name of the event, the location of the event, a time zone of the event, the event week (e.g., a written time value such as "this week"), the event date (e.g., a numerical time value such as "Oct. 23, 2024"), the event year (e.g., a numerical time value), the event month (e.g., a numerical time value), the event month name (e.g., a written time value such as "march" and/or "this month"), event day (e.g., a written time value such as "this Tuesday" and/or "Tuesday"), and/or a description of the event. In another example, for each listing stored in the external data 131, the data processing service 207 can generate a respective listing document, which can include the name of the listing, the address of the listing, the email address of the listing, the description of the listing, and/or any other information associated with the listing. The data processing service 207 can generate the event documents and the listing documents as contextual documents. The computing environment 101 can store the event documents and the listing documents in the metadata 137.

The data processing service 207 can generate the written time values and store the written time values in the contextual documents. For example, the data processing service 207 can generate the relative timing data. The data processing service 207 can generate the relative timing data by comparing the current time with the event time. On identifying that the event is, for example, "next Wednesday," based on the current time and the event time listed in the external data 131, the data processing service 207 can populate the term "next Wednesday" into the events document. The data processing service 207 can generate any particular form of relative timing data and store the generated relative timing data as metadata 137 and/or in the particular contextual document.

The data processing service 207 can employ a natural language processing system to identify temporal data associated with events written into a particular description. For example, the data processing service 207 can receive from an external resource 105 a flyer describing an event and stating, "the event will be held on the last Friday of next month." Continuing this example, the data processing service 207 can generate absolute timing data based on the prior statement using the natural language processing system and the current date of the computing environment at the time of analysis. In doing so, the data processing service 207 can generate a numerical value for the date of the event by comparing the real-time of the computing environment 101 against the statement "last Friday of next month."

The data processing service 207 can generate lists of contextual documents that share common traits. For example, the data processing service 207 can generate lists that include associated events, associated listings, associated organizations, and/or any other commonly shared information. The management console 147 can store the event documents, the listing documents, or a combination thereof as unique lists. Each list can be associated with a particular organization, a set of events, a set of listings, a geographic area, or a combination thereof. For example, the data processing service 207 can generate event documents for all events occurring in the Dallas area. The management console 147 can store the generated event documents in the metadata 137 as a list of event documents associated with the Dallas area.

The client application 123 of the client device 103 can include a dashboard that interfaces with the metadata 137 and displays the various event and listing documents. For example, the client application 123 can render on the display 115 one or more lists of event documents for events taking place in the Austin area.

Once the contextual documents are generated, the processing console 149 can employ a data vectorizer 209 to generate vector embeddings for each word used in the contextual documents. The data vectorizer 209 can function as a component of the processing console 149. The data vectorizer 209 can include the tokenization algorithm and the vector embedding algorithm. The data vectorizer 209 can employ the tokenization algorithm to generate one or more tokens for each of the contextual documents. For example, the data vectorizer 209 can employ the NLTK word tokenizer to generate one or more tokens for each word present in the contextual documents. The data vectorizer 209 can store the tokens associated with each word in the metadata 137. The data vectorizer 209 can generate vector embeddings for each token through the vector embedding algorithm. For example, the data vectorizer 209 can employ the Word2Vec algorithm to generate vector embeddings for each of the tokens. The data vectorizer 209 can send the vector embeddings to the vectorized data 139 of the data store 111. By storing the vector embeddings in the vectorized data 139 of the data store 111, the computing environment 101 can organize the various words of a contextual document using numerical representations within a multi-dimensional space. When stored in the vectorized data 139, each vector embedding for each token can include a link to the contextual document from which the token was generated. As shown in further detail herein, the computing environment 101 can quantitatively compare tokens based on their vector embeddings and identify contextual documents that bear the most similarities.

The computing environment 101 can generate the contextual documents to augment a particular LLM with up-to-date data. For example, the processes of the external resource feed API 201, the interface APIs 203, the data intake system 205, the data processing service 207, and the data vectorizer 209 can function similarly to a novel RAG model for augmenting the LLMs with up-to-date data. By generating contextual documents, the computing environment 101 can translate temporal data received from the external resources 105 into data that is interpretable by the LLMs. For example, by generating relative timing data (e.g., the written time values) and absolute timing data (e.g., the numerical time values) for each contextual document, the LLMs employed by the processing console 149 can process the contextual documents and generate responses based on up-to-date data without suffering the interpretation issues present when processing raw temporal data received from the external resources 105.

The process of generating contextual documents and generating vectorized equivalents of the contextual document can occur, before, during, and/or after receiving a particular query from the client device 103. For example, the processes of the external resource feed API 201, the interface APIs 203, the data intake system 205, the data processing service 207, and the data vectorizer 209 can be performed prior to receiving a query from the client device 103, while receiving a query from the client device 103, and/or after receiving a query from the client device 103. By continually processing the external data 131 at any particular interval in time relative to receiving a query, the computing environment 101 can have a repository of up-to-date data. For example, in an instance where a particular contextual document is outdated (e.g., the temporal data is stale), the data processing service 207 can update the relative timing data and the absolute timing data of the particular contextual document.

Once the computing environment 101 has processed the external data 131 and vectorized the contextual documents, the computing environment 101 can wait for a query request received form the client device 103. When the client device 103 activates the client application 123, the client device can render a sampler query generated by the computing environment 101. The sample query can include example messages that can be used to prompt the computing environment 101 to provide information. On receiving a query request through the software interface 215 of the client device 103, the computing environment 101 can store the query request in the query data 133 and commence processing the query request. For example, the software interface 215 can include a chatbox allowing a user to input text (e.g., the query request) stating, "During this month, when are the next three baseball games in New York City?"

The processing console 149 can include a request processing system 211 that can process query requests and gather adequate data from the vectorized data 139 for further processing by the particular LLM. For example, the request processing system 211 can employ a natural language processing algorithm from the model data 135 along with the current time of the computing environment 101 to identify the current month of the query request, the current date relative to the next three baseball games, and the location where the query request is requesting information (e.g., New York City). In another example, the request processing system 211 can employ the natural language process system to identify the statement "during this month" as relative timing data and convert the identified relative timing data into absolute timing data (e.g., setting the absolute timing data of the query response to "February" or "Feb. 2, 2022" based on the current time of the computing environment). The request processing system 211 can employ the vectorization algorithm to vectorize the query request and compare the vector embeddings of the query request with the vector embeddings stored in the vectorized data 139. By generating vector embedding for the query requests, the request processing system 211 can identify vector embeddings in the vectorized data 139 that most closely resemble the query request (e.g., are closest in numerical proximity to the embedded vectors of the query request) and extract the contextual documents that most closely relate to the query request. For example, by vectorizing the statement "this month," the request processing system 211 can identify, using vector comparisons, all event documents that were tagged by the data processing service 207 to include the event month name of "this month."

The request processing system 211 can aggregate the contextual documents associated with the query request and produce a prompt for a response generator 213. The response generator 213 can be a component of the processing console 149 and can include one or more LLMs to generate responses based on the prompt. For example, the request processing system 211 can include all relevant contextual documents gathered through vector comparisons, the text of the prompt request, and a prompt asking the LLM to generate a response based on the contextual documents and the prompt request. Continuing this example, the request processing system 211 can for the prompt by concatenating the contextual documents with the query request. The request processing system 211 can store the prompt in the generated query 141 of the data store 111.

The request processing system 211 can forward the prompt to the response generator 213 to generate a particular response. For example, the response generator 213 can include an API for interfacing with GPT3.5. The response generator 213 can send the prompt to GPT3.5 and receive a response in return. The response generator 213 can include natural language processing systems and other safety algorithms to check the accuracy of the response, ensure there is no profanity in the response, and/or any other quality-related issues associated with the response. The request processing system 211, through the management console 147, can send the response to the client device 103. The client device 103, using the client application 123 and the software interface 215, can render on the display 115 the response generated by the response generator 213.

The computing environment 101 can record the entire communication between the client device 103 and the computing environment 101 along with the process steps performed by the computing environment in the historical data 145. The computing environment 101 can reference the historical data 145 for failed communications (e.g., query requests that were inadequately answered), successful communications, and/or any other communication performed between the computing environment 101 and the client device 103. For example, the computing environment 101 can compare the query request to historical data 145 to potentially identify a past communication that requests similar data.

Figure 3:
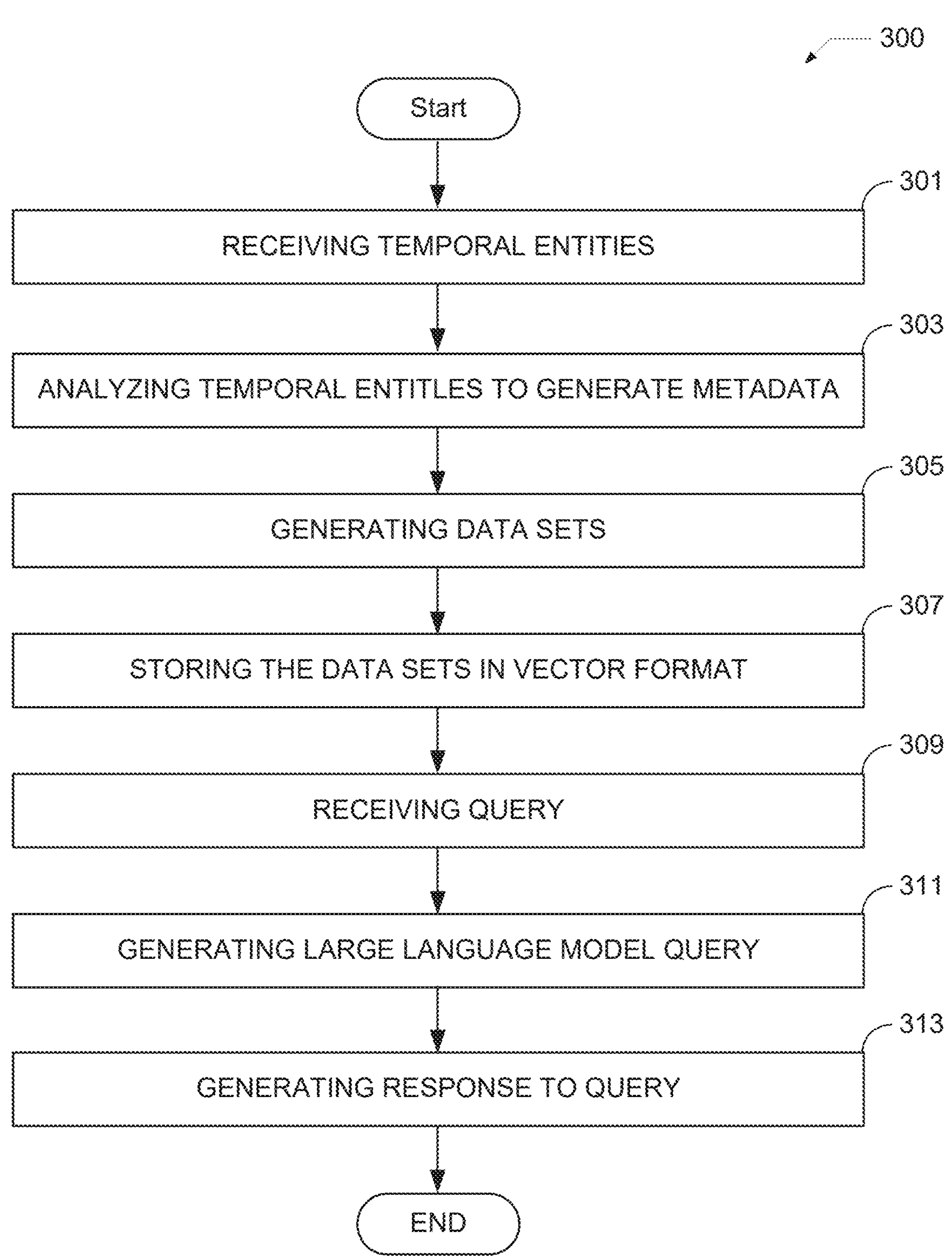
FIG. 3 illustrates a flowchart of a process, according to one example of the disclosed technology.

Referring now to FIG. 3, illustrated is a flowchart of a process 300, according to one example of the disclosed technology. The process 300 can demonstrate a technique for generating a response from an LLM based on contextual documents generated by the computing environment 101. Although illustrated in a particular order, the boxes of process 300 can be performed in any particular order that can be appreciated herein. The process 300 can define substantially similar techniques performed in the workflow 200 and discussed in FIG. 2.

At box 301, the process 300 can include receiving one or more sets of temporal entries (also referred to herein as temporal data). The computing environment 101 can receive one or more sets of temporal entities. The temporal entities can define any particular temporal data the computing environment 101 receives from the external resources 105. The temporal data can include the raw data received from the external resources 105, the event data received from the external resources 105, and the listings data received from the external resources 105. In some examples, the temporal entities can include the events and listing data. In other examples, the temporal entities can function as sub-data of the events data and listings data.

The processing console 149 can employ the external resource feed API 201 and/or the interfacing APIs 203 to receive the temporal entities from the external resources 105. For example, the processing console 149 through the external resource feed API 201 and/or the interfacing APIs 203 can generate a request for temporal entities, events data, listings data, or a combination thereof.

At box 303, the process 300 can include analyzing the temporal entries to generate the metadata 137 individually corresponding to a respective one of the temporal entries. The computing environment 101 can analyze the temporal entries to generate the metadata 137, where each of the metadata 137 can individually correspond to a respective one of the temporal entries. The processing console 149 can employ the data processing service 207 to generate the metadata 137. The metadata 137 can include the contextual documents (e.g., the event documents and/or the listing documents). The processing console 149 can extract from the external data 131 the temporal entities that are associated with events and the temporal entities associated with the listings. The temporal entities can be in a tabular format. For each temporal data associated with each event, The processing console 149 can employ the data processing service 207 to generate an associated event document. For each temporal data associated with each listing, The processing console 149 can employ the data processing service 207 to generate an associated listing document. For example, the data processing service 207 can generate the event document and/or the listing document by translating all time-based information from the temporal entities into relative timing data and absolute timing data. The relative timing data can include a list of textual terms used to describe the timing of the event (e.g., "this Friday," "next week," "in a couple of months," "every other month," etc.). The absolute timing data can include a list of textual and numerical terms used to describe the timing of the event (e.g., "march," "Feb. 3, 2022," "Friday the 17$^{th}$ of July," "32 week of 2023," etc.) By including the absolute timing data and the relative timing data, the contextual documents can provide the LLMs used by the response generator 213 sufficient temporal data to generate accurate responses to a particular query request. The data processing service 207 can employ natural language processing techniques and/or any particular algorithm to convert the temporal entities into the relative timing data and the absolute timing data. The data processing service 207 can populate the metadata 137 (e.g., the contextual documents) with address data, email data, location data, listing descriptions, event descriptions, and/or any other information associated with the event and/or listing.

At box 305, the process 300 can include generating one or more data sets individually including a respective one of the temporal entries and a corresponding one of the metadata 137. The computing environment 101 can generate one or more data sets individually including a respective one of the temporal entries and a corresponding one of the metadata 137. The computing environment 101 can store the temporal entities and the metadata 137 of each temporal entity as a data set in the data store 111. For example, the computing environment 101 can link the temporal entities with their corresponding contextual documents. The computing environment 101 can store contextual documents with similar attributes within various data sets. For example, the computing environment 101 can generate a first data set including all event documents and/or listing documents associated with events and/or listings occurring in the same week. In another example, the computing environment 101 can generate a second data set including all event documents and/or listing documents associated with events and/or listings occurring in the same area. In yet another example, the computing environment 101 can generate a third data set including all event documents and/or listing documents associated with events and/or listings associated with the same organization. The computing environment 101 can generate a listing data set, which can include all listings gathered from the external resources 105 and analyzed by the computing environment 101. The computing environment 101 can generate an events data set, which can include all events gathered from the external resources 105 and analyzed by the computing environment 101. The computing environment 101 can generate any particular category of data sets to group particular types of metadata 137.

At box 307, the process 300 can include storing the data sets in the data store 111 in vector format. The computing environment 101 can store the data sets in the data store 111 in vector format. Through the data vectorizer 209, the computing environment 101 can employ the tokenization algorithm to tokenize each contextual document stored in the data sets. Through the data vectorizer 209, the computing environment 101 can employ the vector embedding algorithm to generate vector embeddings for each of the tokens associated with the contextual documents stored in the data sets. The data vectorizer 209 can store the data sets with their associated vector embeddings into the vectorized data 139.

At box 309, the process 300 can include receiving the query request, which can include a set of query text. The computing environment 101 can receive the query request, which can include the set of query text. The client device 103 can receive through the client application 123, input devices 125, and/or the software interface 215 the query request. For example, the client device 103 can render a chatbox through the client application 123 and/or the software interface 215. Continuing this example, the client device 103 can receive through the chatbox the query request, which can include the set of query text. The set of query text can include natural language that describes a request for the computing environment 101 to reproduce particular information. For example, the query request can include a statement such as, "When and where can I see a Will Ferrell movie in the next three months?"

At box 311, the process 300 can include generating an LLM query (referred to herein as the prompt), where the LLM query can include at least a portion of a subset of the data sets based on the set of query text. The computing environment 101 can generate the LLM query, where the LLM query can include at least a portion of the subset of the data sets based on the set of query text. The request processing system 211 can employ the vector embedding algorithms to generate vector embeddings for the query request. The request processing system 211 can compare the vector embeddings of the query request with the vector embeddings of the data set stored in the vectorized data 139. The request processing system 211 can identify the subset of the data sets that are most similar to the query data based on the proximity of the vectorized embeddings. For example, the request processing system 211 can identify the vector embeddings of the data sets that are closest in proximity in the multi-dimensional space to the vector embeddings of the query request. On identifying the subset of the data sets closest in proximity to the vector embeddings of the query data, the request processing system 211 can identify the contextual documents associated with the subset of the data sets. The request processing system 211 can generate the LLM query, where the LLM query can include the identified contextual documents (e.g., the identified listings data sets and/or the events data sets) and the query request. In some examples, the computing environment 101 can generate a RAG query, which can be substantially similar to the LLM query and used for processing by a particular RAG model. In various examples, the computing environment 101 can include a subset of the metadata 137 in the portion of the subset of the data sets.

At box 313, process 300 can include generating a response to the query request based on an output of an LLM system in response to the LLM query. The computing environment 101 can generate a response to the query request based on the output of the LLM system in response to the LLM query. The request processing system 211 can forward the LLM query to the response generator 213. The response generator 213, functioning as a component of the processing console 149, can employ one or more LLM systems stored in the model data 135 to process the LLM query and generate the response. In using the LLM query to generate the response, the LLM system of the response generator 213 can generate responses based on up-to-date and interpretable data. On generating the response, the processing console 149 can employ the management console 147 to forward the response to the client device for rendering through the client application 123 and/or the software interface 215. The client device 103 can continually send subsequent query requests to the computing environment 101 to continue requesting updated, similar, and/or new information.

From the foregoing, it will be understood that various aspects of the processes described herein are software processes that execute on computer systems that form parts of the system. Accordingly, it will be understood that various examples of the system described herein are generally implemented as specially-configured computers, including various computer hardware components and, in many cases, significant additional features as compared to conventional or known computers, processes, or the like, as discussed in greater detail herein. Examples within the scope of the present disclosure also include computer-readable media for carrying or having computer-executable instructions or data structures stored thereon. Such computer-readable media can be any available media that can be accessed by a computer or downloadable through communication networks. By way of example, and not limitation, such computer-readable media can comprise various forms of data storage devices or media such as RAM, ROM, flash memory, EEPROM, CD-ROM, DVD, or other optical disk storage, magnetic disk storage, solid-state drives (SSDs) or other data storage devices, any type of removable non-volatile memories such as secure digital (SD), flash memory, memory stick, etc., or any other medium which can be used to carry or store computer program code in the form of computer-executable instructions or data structures and which can be accessed by a general-purpose computer, special purpose computer, specially-configured computer, mobile device, etc.

When information is transferred or provided over a network or another communications connection (either hardwired, wireless, or a combination of hardwired or wireless) to a computer, the computer properly views the connection as a computer-readable medium. Thus, any such a connection is properly termed and considered a computer-readable medium. Combinations of the above should also be included within the scope of computer-readable media. Computer-executable instructions comprise, for example, instructions and data that cause a general-purpose computer, special-purpose computer, or special-purpose processing device such as a mobile device processor to perform one specific function or a group of functions.

Those skilled in the art will understand the features and aspects of a suitable computing environment in which aspects of the disclosure may be implemented. Although not required, some of the examples of the claimed innovations may be described in the context of computer-executable instructions, such as program modules or engines, as described earlier, being executed by computers in networked environments. Such program modules are often reflected and illustrated by flow charts, sequence diagrams, example screen displays, and other techniques used by those skilled in the art to communicate how to make and use such computer program modules. Generally, program modules include routines, programs, functions, objects, components, data structures, and application programming interface (API) calls to other computers, whether local or remote, etc., that perform particular tasks or implement particular defined data types within the computer. Computer-executable instructions, associated data structures and/or schemas, and program modules represent examples of the program code for executing steps of the methods disclosed herein. The particular sequence of such executable instructions or associated data structures represents examples of corresponding acts for implementing the functions described in such steps.

Those skilled in the art will also appreciate that the claimed and/or described systems and methods may be practiced in network computing environments with many types of computer system configurations, including personal computers, smartphones, tablets, hand-held devices, multi-processor systems, microprocessor-based or programmable consumer electronics, networked PCs, minicomputers, mainframe computers, and the like. Examples of the claimed innovation are practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

An example system for implementing various aspects of the described operations, which is not illustrated, includes a computing device including a processing unit, a system memory, and a system bus that couples various system components including the system memory to the processing unit. The computer will typically include one or more data storage devices for reading data from and writing data to. The data storage devices provide nonvolatile storage of computer-executable instructions, data structures, program modules, and other data for the computer.

Computer program code that implements the functionality described herein typically comprises one or more program modules that may be stored on a data storage device. This program code, as is known to those skilled in the art, usually includes an operating system, one or more application programs, other program modules, and program data. A user may enter commands and information into the computer through keyboard, touch screen, pointing device, a script containing computer program code written in a scripting language, or other input devices (not shown), such as a microphone, etc. These and other input devices are often connected to the processing unit through known electrical, optical, or wireless connections.

The computer that affects many aspects of the described processes will typically operate in a networked environment using logical connections to one or more remote computers or data sources, which are described further below. Remote computers may be another personal computer, a server, a router, a network PC, a peer device, or other common network nodes, and typically include many or all of the elements described above relative to the main computer system in which the innovations are embodied. The logical connections between computers include a local area network (LAN), a wide area network (WAN), virtual networks (WAN or LAN), and wireless LANs (WLAN) that are presented here by way of example and not limitation. Such networking environments are commonplace in office-wide or enterprise-wide computer networks, intranets, and the Internet.

When used in a LAN or WLAN networking environment, a computer system implementing aspects of the innovation is connected to the local network through a network interface or adapter. When used in a WAN or WLAN networking environment, the computer may include a modem, a wireless link, or other mechanisms for establishing communications over the wide-area network, such as the Internet. In a networked environment, program modules depicted relative to the computer, or portions thereof, may be stored in a remote data storage device. It will be appreciated that the network connections described or shown as examples and other mechanisms of establishing communications over wide area networks or the Internet may be used.

While various aspects have been described in the context of a preferred example, additional aspects, features, and methodologies of the claimed innovations will be readily discernible from the description herein by those of ordinary skill in the art. Many examples and adaptations of the disclosure and claimed innovations other than those herein described, as well as many variations, modifications, and equivalent arrangements and methodologies, will be apparent from or reasonably suggested by the disclosure and the foregoing description thereof, without departing from the substance or scope of the claims. Furthermore, any sequence(s) and/or temporal order of steps of various processes described and claimed herein are those considered to be the best mode contemplated for carrying out the claimed innovations. It should also be understood that, although steps of various processes may be shown and described as being in a preferred sequence or temporal order, the steps of any such processes are not limited to being carried out in any particular sequence or order, absent a specific indication of such to achieve a particular intended result. In most cases, the steps of such processes may be carried out in a variety of different sequences and orders, while still falling within the scope of the claimed innovations. In addition, some steps may be carried out simultaneously, contemporaneously, or in synchronization with other steps.

Clause 1. A system, comprising: a memory; and at least one computing device in communication with the memory, wherein the at least one computing device being configured to: receive a plurality of temporal entries; analyze the plurality of temporal entries to generate a plurality of metadata individually corresponding to a respective one of the plurality of temporal entries; generate a plurality of data sets individually comprising a respective one of the plurality of temporal entries and a corresponding one of the plurality of metadata; store the plurality of data sets in a data store in vector format; receive a query comprising a set of query text; generate a large language model (LLM) query comprising at least a portion of a subset of the plurality of data sets based on the set of query text; and generate a response to the query based on an output of an LLM system in response to the LLM query.

Clause 2. The system of clause 1 or any other clause herein, wherein the at least one computing device is further configured to: receive a plurality of listing entries, wherein the plurality of temporal entries are each associated with a respective one of the plurality of listing entries; generate a plurality of listing data sets individually comprising a respective one of the plurality of listing entries and a corresponding one of a plurality of listing metadata; and store the plurality of listing data sets in the data store in vector format.

Clause 3. The system of clause 2 or any other clause herein, wherein the LLM query comprises at least a portion of a subset of the plurality of listing data sets based on the set of query text.

Clause 4. The system of clause 1 or any other clause herein, wherein the LLM query comprises a retrieval-augmented generation (RAG) query.

Clause 5. The system of clause 1 or any other clause herein, wherein individual ones of the plurality of metadata comprise relative and absolute timing data for the LLM system to resolve relative timing for the LLM system.

Clause 6. The system of clause 1 or any other clause herein, wherein the portion of the subset of the plurality of data sets comprises metadata from the plurality of metadata.

Clause 7. The system of clause 1 or any other clause herein, wherein the at least one computing device is further configured to: generate a vector representation of the set of query text; and identify the subset of the plurality of data sets based on the vector representation of the set of query text.

Clause 8. A method, comprising: receiving, via one of one or more computing devices, a plurality of temporal entries; analyzing, via one of the one or more computing devices, the plurality of temporal entries to generate a plurality of metadata individually corresponding to a respective one of the plurality of temporal entries; generating, via one of the one or more computing devices, a plurality of data sets individually comprising a respective one of the plurality of temporal entries and a corresponding one of the plurality of metadata; storing, via one of the one or more computing devices, the plurality of data sets in a data store in vector format; receiving, via one of the one or more computing devices, a query comprising a set of query text; generating, via one of the one or more computing devices, a large language model (LLM) query comprising at least a portion of a subset of the plurality of data sets based on the set of query text; and generating, via one of the one or more computing devices, a response to the query based on an output of an LLM system in response to the LLM query.

Clause 9. The method of clause 8 or any other clause herein, further comprising: transmitting, via one of the one or more computing devices, a message comprising at least one sample query to a mobile computing device; receiving, via one of the one or more computing devices, the query comprising the set of query text from the mobile computing device; transmitting, via one of the one or more computing devices, the response to the query to the mobile computing device; and receiving, via one of the one or more computing devices, a second query comprising a set of second query text from the mobile computing device.

Clause 10. The method of clause 8 or any other clause herein, further comprising formatting, via one of the one or more computing devices, the plurality of temporal entries into a structure compatible with the data store.

Clause 11. The method of clause 8 or any other clause herein, wherein individual ones of the plurality of metadata comprise timing data for the LLM system to resolve at least one relative date.

Clause 12. The method of clause 8 or any other clause herein, wherein the at least one computing device is further configured to: receiving, via one of the one or more computing devices, a plurality of listing entries; analyzing, via one of the one or more computing devices, the plurality of listing entries to generate a plurality of listing metadata individually corresponding to a respective one of the plurality of listing entries; and generating, via one of the one or more computing devices, a plurality of listing data sets individually comprising a respective one of the plurality of listing entries and a corresponding one of the plurality of listing metadata.

Clause 13. The method of clause 12 or any other clause herein, further comprising: storing, via one of the one or more computing devices, the plurality of listing data sets in the data store in vector format; and generating, via one of the one or more computing devices, the large language model (LLM) query further comprising at least a portion of a subset of the plurality of listing data sets based on the set of query text.

Clause 14. The method of clause 12 or any other clause herein, further comprising generating, via one of the one or more computing devices, a categorized reference list for the plurality of listing entries.

Clause 15. A non-transitory computer-readable medium embodying a program that, when executed by at least one computing device, causes the at least one computing device to: receive a plurality of temporal entries; analyze the plurality of temporal entries to generate a plurality of metadata individually corresponding to a respective one of the plurality of temporal entries; generate a plurality of data sets individually comprising a respective one of the plurality of temporal entries and a corresponding one of the plurality of metadata; store the plurality of data sets in a data store in vector format; receive a query comprising a set of query text; generate a large language model (LLM) query comprising at least a portion of a subset of the plurality of data sets based on the set of query text; and generate a response to the query based on an output of an LLM system in response to the LLM query.

Clause 16. The non-transitory computer-readable medium of clause 15 or any other clause herein, wherein the program further causes the at least one computing device to: parse the set of query text to identify a textual representation of a relative date; and mapping the textual representation of the relative date to an absolute date.

Clause 17. The non-transitory computer-readable medium of clause 15 or any other clause herein, wherein the program further causes the at least one computing device to update at least one relative date in the plurality of data sets in response to determining the at least one relative date is stale.

Clause 18. The non-transitory computer-readable medium of clause 15 or any other clause herein, wherein individual ones of the plurality of metadata comprise timing data for the LLM system to resolve relative timing based on at least one time zone.

Clause 19. The non-transitory computer-readable medium of clause 15 or any other clause herein, wherein the program further causes the at least one computing device to analyze the set of query text using a natural language processing algorithm to generate at least one context, wherein the LLM query is generated based on the at least one context.

Clause 20. The non-transitory computer-readable medium of clause 15 or any other clause herein, wherein the program further causes the at least one computing device to modify the response to the query to append at least one user interface widget.

The examples were chosen and described in order to explain the principles of the claimed innovations and their practical application so as to enable others skilled in the art to utilize the innovations and various examples and with various modifications as are suited to the particular use contemplated. Alternative examples will become apparent to those skilled in the art to which the claimed innovations pertain without departing from their spirit and scope. Accordingly, the scope of the claimed innovations is defined by the appended claims rather than the foregoing description and the examples described therein.

What is claimed is:

1. A system, comprising:

a memory; and at least one computing device in communication with the memory, wherein the at least one computing device being configured to:

receive a plurality of temporal entries;

analyze the plurality of temporal entries to generate a plurality of metadata individually corresponding to a respective one of the plurality of temporal entries;

generate a plurality of data sets individually comprising a respective one of the plurality of temporal entries and a corresponding one of the plurality of metadata;

store the plurality of data sets in a data store in vector format;

transmit a message comprising at least one sample query to a mobile computing device;

receive a query comprising a set of query text from the mobile computing device;

generate a large language model (LLM) query comprising at least a portion of a subset of the plurality of data sets based on the set of query text;

generate a response to the query based on an output of an LLM system in response to the LLM query;

transmit the response to the query to the mobile computing device; and receive a second query comprising a set of second query text from the mobile computing device.

2. The system of claim 1, wherein the at least one computing device is further configured to:

receive a plurality of listing entries, wherein the plurality of temporal entries are each associated with a respective one of the plurality of listing entries;

generate a plurality of listing data sets individually comprising a respective one of the plurality of listing entries and a corresponding one of a plurality of listing metadata; and store the plurality of listing data sets in the data store in vector format.

3. The system of claim 2, wherein the LLM query comprises at least a portion of a subset of the plurality of listing data sets based on the set of query text.

4. The system of claim 1, wherein the LLM query comprises a retrieval-augmented generation (RAG) query.

5. The system of claim 1, wherein individual ones of the plurality of metadata comprise relative and absolute timing data for the LLM system to resolve relative timing for the LLM system.

6. The system of claim 1, wherein the portion of the subset of the plurality of data sets comprises metadata from the plurality of metadata.

7. The system of claim 1, wherein the at least one computing device is further configured to:

generate a vector representation of the set of query text; and identify the subset of the plurality of data sets based on the vector representation of the set of query text.

8. A method, comprising:

receiving, via one of one or more computing devices, a plurality of temporal entries;

analyzing, via one of the one or more computing devices, the plurality of temporal entries to generate a plurality of metadata individually corresponding to a respective one of the plurality of temporal entries;

generating, via one of the one or more computing devices, a plurality of data sets individually comprising a respective one of the plurality of temporal entries and a corresponding one of the plurality of metadata;

storing, via one of the one or more computing devices, the plurality of data sets in a data store in vector format;

transmitting, via one of the one or more computing devices, a message comprising at least one sample query to a mobile computing device;

receiving, via one of the one or more computing devices, a query comprising a set of query text from the mobile computing device;

generating, via one of the one or more computing devices, a large language model (LLM) query comprising at least a portion of a subset of the plurality of data sets based on the set of query text;

generating, via one of the one or more computing devices, a response to the query based on an output of an LLM system in response to the LLM query;

transmitting, via one of the one or more computing devices, the response to the query to the mobile computing device; and receiving, via one of the one or more computing devices, a second query comprising a set of second query text from the mobile computing device.

9. The method of claim 8, further comprising formatting, via one of the one or more computing devices, the plurality of temporal entries into a structure compatible with the data store.

10. The method of claim 8, wherein individual ones of the plurality of metadata comprise timing data for the LLM system to resolve at least one relative date.

11. The method of claim 8, further comprising:

receiving, via one of the one or more computing devices, a plurality of listing entries;

analyzing, via one of the one or more computing devices, the plurality of listing entries to generate a plurality of listing metadata individually corresponding to a respective one of the plurality of listing entries; and generating, via one of the one or more computing devices, a plurality of listing data sets individually comprising a respective one of the plurality of listing entries and a corresponding one of the plurality of listing metadata.

12. The method of claim 11, further comprising:

storing, via one of the one or more computing devices, the plurality of listing data sets in the data store in vector format; and generating, via one of the one or more computing devices, the large language model (LLM) query further comprising at least a portion of a subset of the plurality of listing data sets based on the set of query text.

13. The method of claim 11, further comprising generating, via one of the one or more computing devices, a categorized reference list for the plurality of listing entries.

14. A non-transitory computer-readable medium embodying a program that, when executed by at least one computing device, causes the at least one computing device to:

receive a plurality of listing entries;

analyze the plurality of listing entries to generate a plurality of listing metadata individually corresponding to a respective one of the plurality of listing entries; and generate a plurality of listing data sets individually comprising a respective one of the plurality of listing entries and a corresponding one of the plurality of listing metadata;

receive a plurality of temporal entries;

analyze the plurality of temporal entries to generate a plurality of metadata individually corresponding to a respective one of the plurality of temporal entries;

generate a plurality of data sets individually comprising a respective one of the plurality of temporal entries and a corresponding one of the plurality of metadata;

store the plurality of data sets in a data store in vector format;

receive a query comprising a set of query text;

generate a large language model (LLM) query comprising at least a portion of a subset of the plurality of data sets based on the set of query text; and generate a response to the query based on an output of an LLM system in response to the LLM query.

15. The non-transitory computer-readable medium of claim 14, wherein the program further causes the at least one computing device to:

parse the set of query text to identify a textual representation of a relative date; and mapping the textual representation of the relative date to an absolute date.

16. The non-transitory computer-readable medium of claim 14, wherein the program further causes the at least one computing device to update at least one relative date in the plurality of data sets in response to determining the at least one relative date is stale.

17. The non-transitory computer-readable medium of claim 14, wherein individual ones of the plurality of metadata comprise timing data for the LLM system to resolve relative timing based on at least one time zone.

18. The non-transitory computer-readable medium of claim 14, wherein the program further causes the at least one computing device to analyze the set of query text using a natural language processing algorithm to generate at least one context, wherein the LLM query is generated based on the at least one context.

19. The non-transitory computer-readable medium of claim 14, wherein the program further causes the at least one computing device to modify the response to the query to append at least one user interface widget.

* * * * *